(12) United States Patent
Valliere

(10) Patent No.: US 11,184,655 B1
(45) Date of Patent: *Nov. 23, 2021

(54) SYSTEM AND METHOD FOR INTELLIGENT DELIVERY OF SEGMENTED MEDIA STREAMS

(71) Applicant: Jonathan James Valliere, Stuart, FL (US)

(72) Inventor: Jonathan James Valliere, Stuart, FL (US)

(73) Assignee: Look At Me, Inc, Stuart, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/167,244

(22) Filed: Feb. 4, 2021

Related U.S. Application Data

(63) Continuation of application No. 16/458,143, filed on Jun. 30, 2019, now Pat. No. 10,917,675, which is a continuation of application No. 15/972,364, filed on May 7, 2018, which is a continuation of application No. 15/790,014, filed on Oct. 22, 2017, now abandoned.

(60) Provisional application No. 62/460,848, filed on Feb. 19, 2017.

(51) Int. Cl.
*H04N 21/239* (2011.01)
*H04N 21/6437* (2011.01)
*H04N 21/2187* (2011.01)
*H04N 21/242* (2011.01)

(52) U.S. Cl.
CPC ....... *H04N 21/239* (2013.01); *H04N 21/2187* (2013.01); *H04N 21/242* (2013.01); *H04N 21/6437* (2013.01)

(58) Field of Classification Search
CPC ............ H04N 21/239; H04N 21/2187; H04N 21/242; H04N 21/6437
USPC ...................................................... 725/116
See application file for complete search history.

(56) References Cited

U.S. PATENT DOCUMENTS

| | | | | |
|---|---|---|---|---|
| 2011/0276994 | A1* | 11/2011 | Higgins | H04N 21/6437 725/39 |
| 2014/0316269 | A1* | 10/2014 | Zhang | A61N 7/02 600/439 |
| 2015/0172340 | A1* | 6/2015 | Lohmar | H04N 21/2401 709/219 |
| 2016/0294898 | A1* | 10/2016 | Wheelock | H04L 65/602 |

* cited by examiner

*Primary Examiner* — Nasser M Goodarzi
*Assistant Examiner* — Jaycee Imperial

(57) ABSTRACT

A system and method for reducing the delay and optimizing the process of delivering real-time media segments on communication networks. This is accomplished by allowing media segment requests to be queued ahead of the time that the segment exists. The system includes the ability to request segments by selected criteria or by explicit reference naming techniques. This reduces delay and optimizes bandwidth usage when applied within otherwise high latency communication networks, including Content Delivery Networks.

4 Claims, 4 Drawing Sheets

Breakout of Segment Request Handler

Media Streaming Server

Breakout of Broadcast Component

Breakout of Viewer Component

Breakout of Segment Request Handler

SYSTEM AND METHOD FOR INTELLIGENT DELIVERY OF SEGMENTED MEDIA STREAMS

CLAIM OF PRIORITY

This application is a continuation of U.S. application Ser. No. 16/458,143 (2019 Jun. 30) which is a continuation of U.S. application Ser. No. 15/972,364 (2018 May 7) which is a continuation of U.S. application Ser. No. 15/790,014 (2017 Oct. 22) claiming priority of U.S. provisional application Ser. No. 62/460,848 (2017 Feb. 19).

TECHNICAL FIELD

The subject of the invention is improving the broadcasting, distribution, and delivery of live audio/video over the internet.

BACKGROUND

For nearly two decades, internet users have been able to enjoy low-delay content delivery over the RTMP protocol in the Adobe Flash Player and more recently via experimental HLS over WebSockets. Both of these methods of content delivery operate by opening a single bi-directional communication channel between the viewer and a server. The media is then relayed, in real-time, to the viewer after being received by the server. This is problematic for a number of reasons: (1) scalability is created through branching, (2) more computing power is needed, (3) the media must be packaged for every viewer individually, (4) the incompatibility with content delivery networks, (5) the requirement for complex load balancing, and (6) inefficient media packaging. Branching provides a method to scale while keeping the delay as low as possible; however, it suffers from the fundamental problem that any upstream "hiccups" will propagate downstream. Any error which forces data to be dropped will cause the stream to become unrecoverable and cause the stream to halt for every viewer until the problem recovers and a keyframe becomes available.

In an effort to simplify distribution and fault-tolerance in live streaming, segmented media streaming over HTTP has become the de-facto standard for media delivery in recent years. Segmented media streaming involves segmenting the stream into documents containing multiple audio/video frames instead of immediately passing each audio/video frame to the viewer.

Segmented media streaming provides greater efficiency by allowing the viewer only to download a segment of the media which he/she wishes to view and by allowing the switching between different quality versions. The two most widely adopted formats for segmented media streaming are: HTTP Live Streaming (HLS) and Dynamic Adaptive Streaming over HTTP (DASH). Both formats employ manifest (e.g. table of contents) documents to describe the stream information and the list of segments and are generally well optimized for static delivery of on-demand content. They provide a number of options for delivering and storing multiple audio and video tracks in an optimized fashion. This allows content providers to optimize their cost of storage and network bandwidth.

While many of these features are important innovations for on-demand content, they pose varying problems with delay-sensitive streaming due to: (1) lack of synchronization with content source, (2) the need to continuously update the manifest document, (3) the need to request resources individually, and (4) the need to periodically open new communication channels when requesting resources.

SUMMARY

The subject invention enhances the Request & Response method used for delivering Segmented Media Streams.

Current implementations of HLS and DASH provide no mechanism to synchronize the manifest updates with the viewer. For this reason, a variable delay of between 0 seconds and the typical segment duration is always present. If a typical segment duration is 2 seconds, it is possible for a viewer to have an additional delay of up to 2 seconds beyond the segments currently listed in the manifest document. This is because the broadcast receiver is "buffering" the next segment. Only when the next segment is completed, can it be added to the manifest for viewers to download. This, itself, is a large problem for predicting delay time.

Delivering low delay content to a large audience requires the need to balance requests across a large pool of servers. For this reason, the viewer must periodically open new connections to new remote devices to maintain the balance and ensure a high level quality of service. Opening and authenticating new connections can often take upwards of 240 ms or more if the round-trip-time between the two devices is 80 ms. This additional delay is totally unacceptable when using segment durations of 1000 ms or less, as it consumes such a large portion of the "acquisition window" (the amount of time allowed to acquire the next document before the viewer playback is paused) where the likelihood of an interruption in the playback drastically increases. For this reason, shifting the "connect and request" phase to a time where the "requested document" does not yet exist and not receiving a response until the "requested document" does exist, will "prime" this phase and shift the potential 240 ms outside of the "acquisition window".

BRIEF DESCRIPTIONS OF THE DRAWINGS

DETAILED DESCRIPTIONS OF THE DRAWINGS

Figure 1:
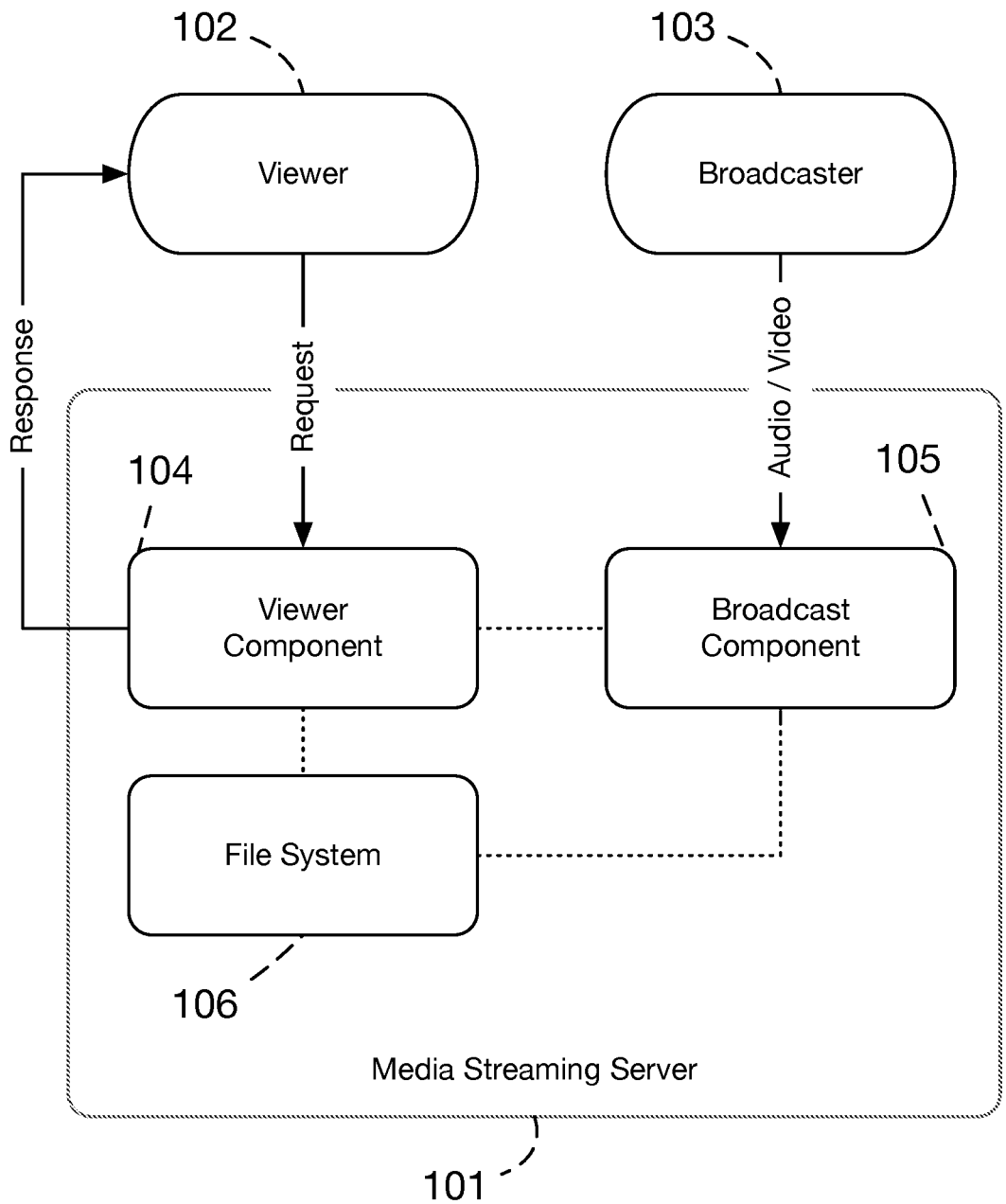
FIG. 1 illustrates the basic components of a server providing the ability to receive streaming media and have viewers play the media using segment-based streaming protocols. (such as HLS or DASH)

As described in the prior art, a Streaming Media Server 101 contains a minimum of the ability to receive incoming streams and allow for Viewers 102 to play the streams in one or more formats. FIG. 1 focuses on the minimum configuration to allow the processing of an incoming stream into a format suitable for segmented media streaming.

In order for the Streaming Media Server 101 to process streams, there must be a Broadcaster 103 and a Broadcast Component 105. This Broadcaster 103 will transmit a stream in a compatible format to the Streaming Media Server 101. The stream is handled and processed by the Broadcast Component 105. The Broadcast Component 105 is responsible for receiving and processing data in such a way that the Audio and Video data can be accessed by other components of the Streaming Media Server 101. The Broadcast Component 105 may also record the incoming stream to the File System 106 or some other suitable storage medium.

Since this invention involves the delivery of Segmented Media Streams, the Viewer 102 is required to Request each Media Segment as described in the arrows pointing from 102 to 104 in FIG. 1. The Viewer 102 must request a Media Segment by name. (e.g. segment_0075.ts) This request is handled by the Viewer Component 104. The Viewer Component 104 is responsible for processing the Viewer's 102 request and responding to it.

Figure 2:
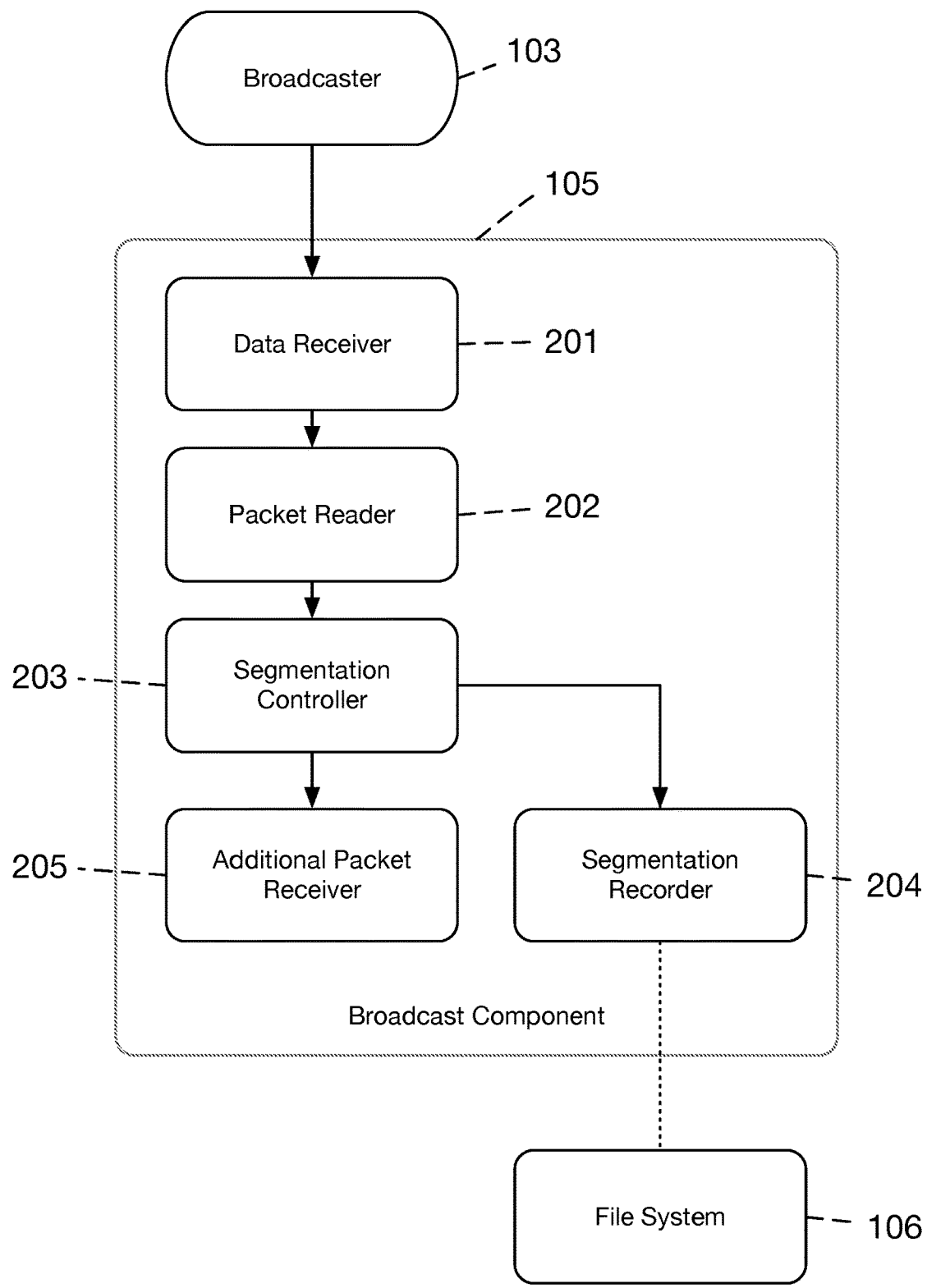
FIG. 2 illustrates the basic components of a server which can receive broadcasts and convert to a segmented media stream. (such as HLS or DASH)

The basic implementation of a Broadcast Component 105 with support for generating Segmented Media Streams is shown in FIG. 2. The role of the Broadcast Component 105 is to receive, process the incoming Broadcast and convert it to a Segmented Media Stream. The Data Receiver 201 and Packet Reader 202 work together to receive and process the raw data produced by the Broadcaster 103 and convert it into individual packets. These packets usually contain a single audio/video frame or other data. For example, a video stream with 30 frames per second should contain 30 video packets per second. Audio is slightly more complicated but the same principal applies.

As part of the segmentation function, each packet is processed. Its timecode, frame type, and other information is read by the Segmentation Controller 203 and decisions are made as to when the segmentation should occur. This requires some stateful information to be stored in the Segmentation Controller 203. The type of information stored in the Segmentation Controller 203 includes but is not limited to: (1) when the last segment occurred, (2) the number of segments created, (3) how many packets have been processed since the last segment, (4) the last packet's timecode, and (5) various other information used to control the segmentation process. The Segmentation Controller 203 forwards the Packets to the Segmentation Recorder 204 and a number of other Additional Packet Receivers 205. When it is determined that a segmentation should occur, the Segmentation Recorder 204 is notified and the queued packets are converted into a Segment and written to the File System 106. Typically, the Segment is written to the File System 106 using a Filename with an incrementing integer. (e.g. segment_4.ts, segment_5.ts, segment_6.ts)

Figure 3:
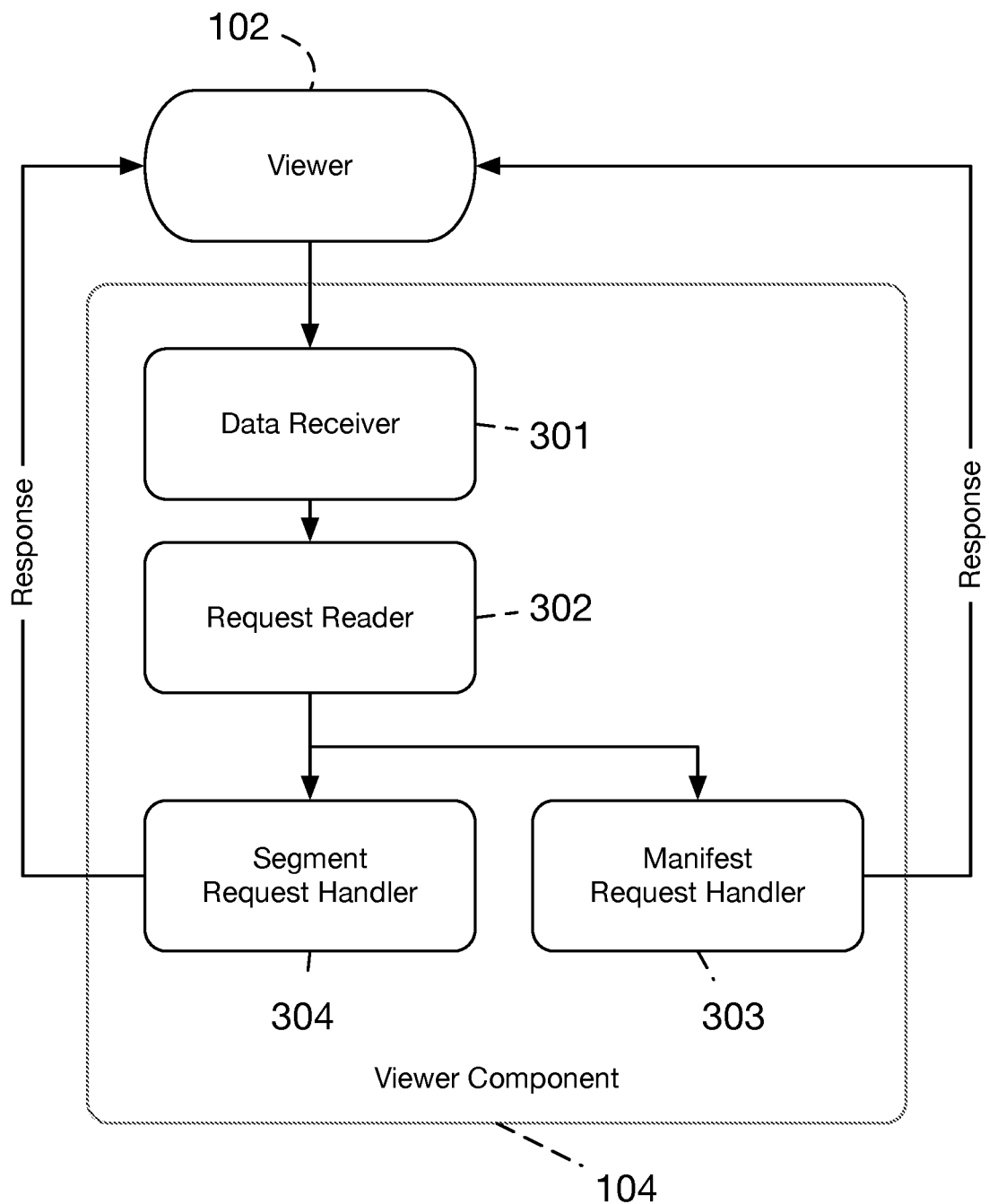
FIG. 3 illustrates the basic components of a server which can deliver media segments and manifest information to viewers, upon request.

FIG. 3 describes the Request & Response pattern used by the Viewer to obtain the Segmented Media Stream and shows the Breakout of the Viewer Component 104. As described in FIG. 3, the Viewer 102 requests the Manifest or an individual Segment File and the Server 101 responds with the requested data or an error message. The Viewer Component 104 contains a Data Receiver 301 to receive the raw data from the Viewer 102 and a Request Reader 302 to convert the raw data into Requests.

The Request Reader 302 must read the type of request and understand how it should be handled. If the Request Reader 302 understands the request type to be a Segment File then it will be forwarded to the Segment Request Handler 304. Same goes for the Manifest and the Manifest Request Handler 303. How the Request Reader 302 determines the type of request is described in the prior art.

Figure 4:
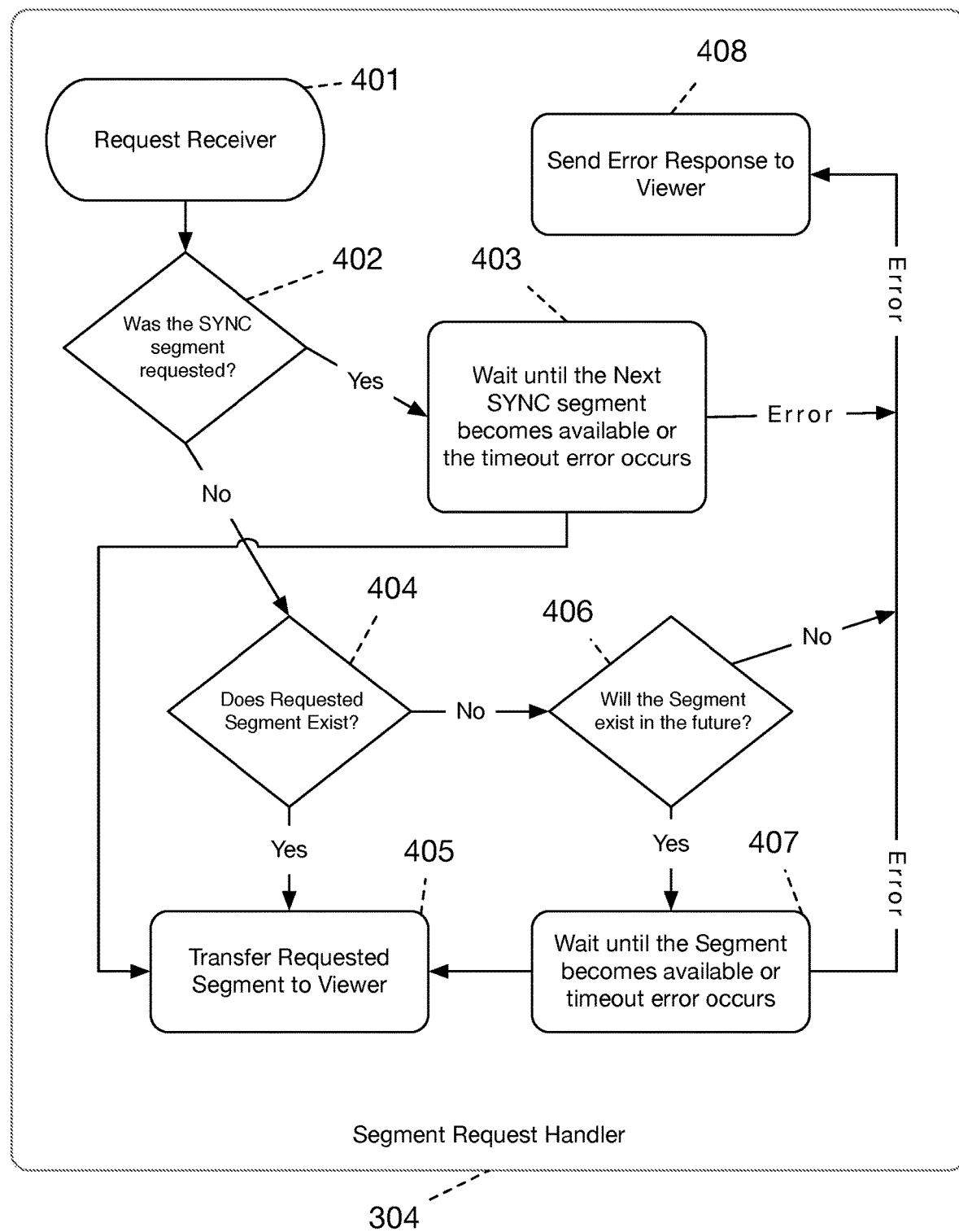
FIG. 4 illustrates the delivery intelligence of the "Segment Request Handler" as shown in 304. Unlike traditional models, the broadcast components and their individual states, from FIG. 2, are taken into consideration to make intelligent decisions on how to handle requests.

The invention is described in FIG. 4 and shows a Breakout of the Segment Request Handler 304. By design, the Request & Response pattern is performed as quickly as possible. Due to this, it can be used to measure the relative performance of the Server 101 by issuing requests and measuring how long they take to complete.

As described in HLS and DASH, there is no specified method of synchronizing the action of the Segmentation Controller 203 with the Viewer 102. For this reason, the effective delay of the Viewer's playback is variable based on the size of the unwritten segment data. FIG. 4 describes the features and functions of this invention that allow for the Viewer to synchronize with the Server and to issue error resistant Segment Requests.

When processing the Request in the Segment Request Handler 304 there are a series of conditions which are executed on Request, in sequence. The only condition to exist in the prior art is 404. In the prior art, the "yes" output of condition 404 would connect to 405 and the "no" output of condition 404 would connect directly to 408.

Upon the Request Reader 302 sending the Request to the Request Receiver 401, the request is read to determine if the requested segment is the special "synchronized" segment in 402. The special "synchronized" segment is identified by a filename which differs from the traditional format of "name_number.ext". For this example, "x-sync" can be used. The "synchronized" segment is a segment which begins with a video keyframe. This is a unique feature of this invention because it allows the Viewer to request a segment by a feature or indicia instead of its literal name. The Viewer has no control over which exact segment is returned; however, it will contain a video keyframe, by contract.

If the "synchronized" segment is determined have been requested in 402 then the flow will progress to 403 where the Segmentation Controller 203 and Segmentation Recorder 204 must be consulted to determine the appropriate time in which the next "synchronized" segment will be made available. The determined appropriate time is used to prevent the request from hanging at 403 forever. If a "synchronized" segment does not become available within the appropriate time then the error is triggered in 408 alerting the Viewer that an error has occurred.

If the "synchronized" segment is not determined to have been requested in 402 then the flow will progress to 404 where a simple true/false condition must determine if the segment does exist. At a minimum, the File System 106 must be consulted. Optionally, the Segmentation Recorder 204 may also be consulted. If the segment does exist then it shall be transferred to the Viewer starting at 405; otherwise the flow shall continue to conditional operation 406.

Conditional operation 406 only states "Will the Segment exist in the Future". The determination if a specific segment will exist in the future comes down to a number of factors. As previously mentioned, segment names follow a naming pattern with a incrementing numerical suffix. (e.g. segment_1, segment_2, segment_3) This naming pattern is predictable and is therefore useful in estimating certain values. Conditional operation 406 may utilize the state and information from the Segmentation Controller 203 and Segmentation Recorder 204 to compare the currently available segments, by number, and to determine the estimated time at which the requested segment MAY become available.

For example, if the Viewer requests segment #2005; the current segment number can be obtained by either 203 or 204 to determine if #2005 is greater than the current segment number. If #2005 is more than 1 greater than the current segment number the segment duration history can be analyzed to estimate the time that #2005 will begin. If the current segment number is #2001 and the segment duration history median value is approximately 1 second per segment then it can be assumed that #2005 should exist 4 seconds into the future. In order to protect the Server from unreasonable requests, it is important to limit the window in which future segments can be requested to around 5 times the median segment duration. The window, in which Viewers may request segments that may exist, is configurable. In the event that the requested segment number is less than the current segment number and had already failed the prior condition 404 then it is assumed that it was deleted as part of a rolling window of segment availability and an error will be returned in 408.

If the requested segment is determined to exist in the near future then the flow will progress to 407 where it will wait until 203/204 have notified 407 that the segment now exists or the timeout has occurred. The timeout is determined by the estimated time at which the segment should become available as described in the previous paragraph.

While the direct time saving that may be expected from the operation of FIG. 4 may, in certain circumstances, be only a fraction of a second, the secondary or indirect time saving of this small time saving could well be an order of magnitude greater due to the consequential reduction in the probability of delays inherent in transmission of the data and the need for the Viewer to adjust delay parameters to maintain uninterrupted playback.

The invention claimed is:

1. In a media streaming network including a broadcast component for producing data segments from a live broadcast, a viewer for requesting data segments by segment identifiers, a server having a viewer component for receiving requests for data segments by said identifiers from said viewer and responding to said viewer with requested data, a method comprising the steps of:
   causing said viewer to possess one of said segment identifiers relating to a data segment that does not then exist within said viewer component,
   causing said viewer to utilize said one segment identifier to request data from said viewer component at a time that said data has not yet come into existence within said network,
   upon receiving said request from said viewer at a time that said data has not yet come into existence within said network,
   causing said viewer component to wait for data related to said one of said segment identifiers to come into existence,
   restricting the duration of time that said viewer component is caused to wait for said data to a window of time,
   responding to said request by causing said viewer component to transfer data related to said one identifier to said viewer.

2. A method in accordance with claim 1 wherein restricting the duration of time that said server is caused to wait for said data segment to a window of time includes the steps of:
   a) causing said server to respond to said request by sending an error signal to said viewer to indicate the expiration of said window of time, and
   b) causing said viewer to receive and use said error signal to cease requesting said data segment from said server.

3. In a media streaming system comprising a broadcast component for producing data segments with each data segment having a non-media portion for containing track information and a media portion containing audio or video media from said live broadcast, a viewer for requesting said data segments by segment identifiers, a delivery network consisting of a pool of servers with each having at least a viewer component for receiving and responding to requests for data segments by said identifiers a method comprising the steps of:
   causing said viewer to utilize one of said segment identifiers to request one of said data segments from one of said pool of servers at a time said media portion of said data segment has yet to come into existence within said delivery network,
   upon said one of said pool of servers receiving said request from said viewer at a time that at least said media portion of said one data segment has not yet come into existence within said one of said pool of servers, then
   waiting for said media portion associated with said one data segment to come into existence within said one of said pool of servers,
   restricting the duration of time that said one of said pool of servers is caused to wait for said media portion to a window of time,
   while within said window of time, causing said one of said pool of servers to receive at least some of said media portion as a result of one or more direct or indirect transfers of data from said broadcast component, and
   responding to said request by causing said one of said pool of servers to transfer at least some of said media data portion of said one data segment to said viewer.

4. A method in accordance with claim 3 wherein restricting the duration of time that said server is caused to wait for said media portion to a window of time includes the steps of:
   a) causing said server to respond to said request by sending an error signal to said viewer to indicate the expiration of said window of time, and
   b) causing said viewer to receive and use said error signal to cease requesting said data segment from said server.

* * * * *